United States Patent
Kwong et al.

(10) Patent No.: US 9,716,815 B2
(45) Date of Patent: *Jul. 25, 2017

(54) COVER GLASS FOR COVERING A CAMERA OF AN ELECTRONIC DEVICE

(71) Applicant: Apple Inc., Cupertino, CA (US)

(72) Inventors: Kelvin Kwong, Cupertino, CA (US); Lee E. Hooton, Cupertino, CA (US); David G. Havskjold, Cupertino, CA (US); Anthony S. Montevirgen, Cupertino, CA (US); Emery A. Sanford, Cupertino, CA (US)

(73) Assignee: APPLE INC., Cupertino, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/875,402

(22) Filed: Oct. 5, 2015

(65) Prior Publication Data

US 2016/0028931 A1  Jan. 28, 2016

Related U.S. Application Data

(63) Continuation of application No. 14/103,661, filed on Dec. 11, 2013, now Pat. No. 9,154,678.

(51) Int. Cl.
*H04N 5/225* (2006.01)
(52) U.S. Cl.
CPC ......... *H04N 5/2254* (2013.01); *Y10T 29/49* (2015.01); *Y10T 29/49826* (2015.01)
(58) Field of Classification Search
CPC .. H04N 5/2254; Y10T 29/49826; Y10T 29/49
See application file for complete search history.

(56) References Cited

U.S. PATENT DOCUMENTS

| | | | |
|---|---|---|---|
| 6,028,711 A * | 2/2000 | Adachi | G02B 13/24 359/642 |
| 6,514,576 B1* | 2/2003 | Kintaka | G02B 5/1857 359/569 |
| 6,547,722 B1* | 4/2003 | Higuma | A61B 1/00096 600/133 |
| 2004/0105026 A1* | 6/2004 | Campbell | H04N 5/2254 348/340 |
| 2008/0055748 A1* | 3/2008 | Konno | A61B 1/00096 359/819 |
| 2009/0268019 A1* | 10/2009 | Ishii | H04N 5/2253 348/65 |
| 2013/0176484 A1 | 7/2013 | Pilliod et al. | |
| 2013/0236699 A1 | 9/2013 | Prest et al. | |

FOREIGN PATENT DOCUMENTS

| | | |
|---|---|---|
| CN | 2657304 | 11/2004 |
| CN | 102131356 | 7/2011 |
| CN | 202262106 | 5/2012 |

\* cited by examiner

*Primary Examiner* — Gevell Selby
(74) *Attorney, Agent, or Firm* — Brownstein Hyatt Farber Schreck, LLP

(57) ABSTRACT

An electronic device can include a camera and a cover glass arrangement disposed over the camera. The cover glass arrangement includes a thinner region or cover glass that is positioned over a light-receiving region of the camera. Additionally, the thinner region or cover glass can be disposed over the light-receiving region and at least parts of one or more non-light receiving regions of the camera.

20 Claims, 4 Drawing Sheets

COVER GLASS FOR COVERING A CAMERA OF AN ELECTRONIC DEVICE

This application is a continuation of U.S. patent application Ser. No. 14/103,661, entitled "Cover Glass Arrangement for an Electronic Device," filed on Dec. 11, 2013, which is incorporated by reference in its entirety as if fully disclosed herein.

TECHNICAL FIELD

The present invention relates generally to electronic devices, and more specifically, to cameras in electronic devices. Still more particularly, the present invention relates to a cover glass arrangement for a camera included in an electronic device.

BACKGROUND

Many electronic devices, such as smart telephones, laptop computers, and tablet computing devices include a camera to capture images and video. FIG. 1 is a cross-sectional view of a prior art electronic device. The electronic device 100 includes a camera 102 positioned adjacent to a surface 104 of the electronic device. The surface can be the front or the back surface of the electronic device 100. In some devices, a cover glass 106 is disposed over the surface 104 when the camera 102 is positioned adjacent to the front surface of the electronic device 100. The cover glass 106 can provide various functions or features for the electronic device. For example, in some embodiments, the cover glass 106 can be a touchscreen and provide an aperture for a speaker and microphone.

In some embodiments, the cover glass 106 can constrain the amount of space that is available to the camera 102. As a result, the functionality of the camera can be limited. For example, a flash module may not be included in the electronic device, or the camera may not include an autofocus feature or a high quality lens.

SUMMARY

In one aspect, an electronic device can include a camera and a first cover glass disposed over the camera. An opening can be formed through the first cover glass over a light-receiving region of the camera. A second cover glass can be positioned in the opening over the light-receiving region of the camera. A thickness of the second cover glass is less than a thickness of the first cover glass. In some embodiments, the second cover glass is a lens for the camera.

In another aspect, an electronic device can include a camera and a monolithic cover glass disposed over the camera. The cover glass includes a thinner region that is positioned over a light-receiving region of the camera. The thinner region can act as a lens for the camera.

In yet another aspect, a method for producing an electronic device can include providing a first cover glass having an opening formed through the first cover glass, and providing a second cover glass in the opening. A location of the opening corresponds to a light-receiving region of a camera. A thickness of the second cover glass is less than a thickness of the first cover glass.

In another aspect, a method for providing an electronic device can include providing a camera in the electronic device, and providing a monolithic cover glass over the camera. The cover glass includes a thinner region that is positioned over a light-receiving region of the camera.

BRIEF DESCRIPTION OF THE DRAWINGS

Embodiments of the invention are better understood with reference to the following drawings. The elements of the drawings are not necessarily to scale relative to each other. Identical reference numerals have been used, where possible, to designate identical features that are common to the figures.

DETAILED DESCRIPTION

Embodiments described herein provide a cover glass arrangement for an electronic device that includes one or more cameras. The cover glass arrangement can include a first cover glass and a second cover glass, where the second cover glass is positioned in an opening formed through the first cover glass. In one embodiment, the second cover glass can be disposed over a light-receiving region of a camera. In another embodiment, the second cover glass is positioned over the light-receiving region and at least part of one or more non-light receiving regions of the camera.

The second cover glass can have a thickness that is less than the thickness of the first cover glass. The thinner second cover glass can provide additional space for the camera and/or for an optional lens. In some embodiments, a higher quality camera can be included in an electronic device when the additional space is provided by the thinner second cover glass. For example, a higher quality camera can include a larger sensor, higher quality lenses, an autofocus feature, and/or a flash module.

In another embodiment, the cover glass arrangement can include a monolithic cover glass that includes a thinner region formed in the cover glass. The thinner region can be disposed over the light-receiving region, or over the light-receiving region and at least part of one or more non-light receiving regions of the camera. Like the second cover glass, the thinner region can provide additional space for the camera and/or for an optional lens.

Figure 1:
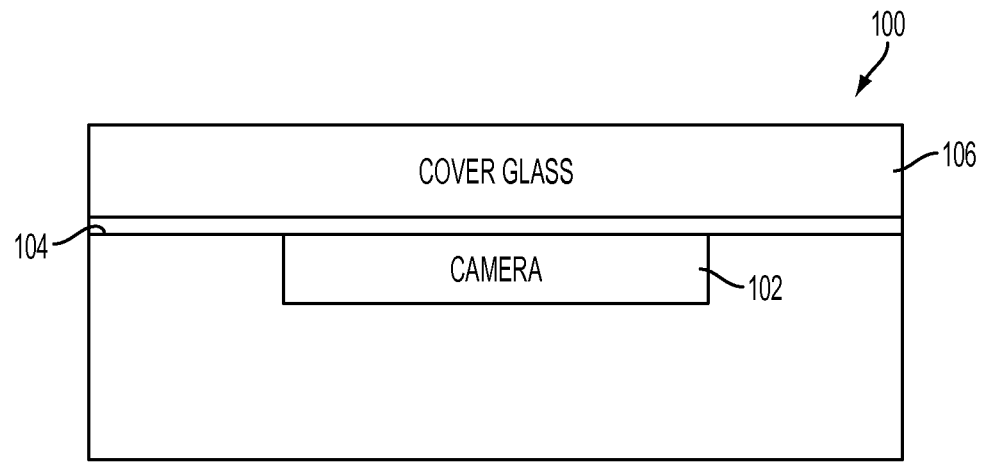
FIG. 1 is a cross-sectional view of a prior art electronic device.
Figure 2A:
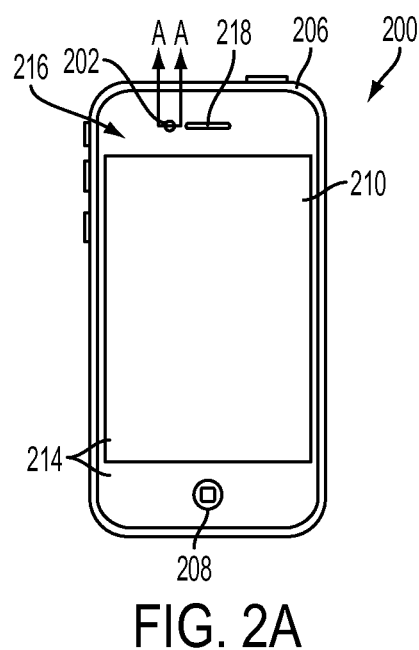
FIG. 2A illustrates a front perspective view of one example of an electronic device that includes one or more cameras.
Figure 2B:
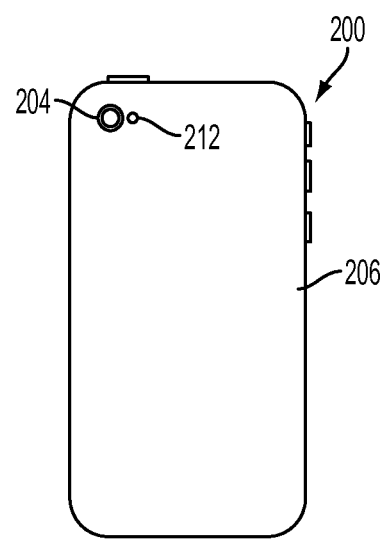
FIG. 2B depicts a rear perspective view of the electronic device 200 shown in FIG. 2A.

Referring now to FIGS. 2A-2B, there are shown front and rear perspective views of one example of an electronic device that can include one or more cameras. The electronic device 200 includes a first camera 202, a second camera 204, an enclosure 206, a display 210, an input/output (I/O) member 208, and an optional flash 212 or light source for the camera or cameras. The electronic device 200 can also include one or more internal components (not shown) typical of a computing or electronic device, such as, for example, one or more processors, memory components, network interfaces, and so on.

In the illustrated embodiment, a cover glass 214 is disposed over the front surface 216 of the electronic device 200. The cover glass 214 can be made of any suitable material, including, but not limited to, glass, plastic, acrylic, sapphire, and various combinations thereof. One or more portions of the cover glass 214 can be an input region for a touch sensing device and/or a force sensing device. The cover glass 214 can include one or more apertures, such as an aperture for a speaker and/or a microphone 218 and the I/O member 208. In the illustrated embodiment, the cover glass 214 is positioned over the entire front surface 216 of the electronic device. Thus, the cover glass 214 is disposed over the display, the first camera 202, and the enclosure 206. In other embodiments, the cover glass 214 can be disposed over one or more portions of a surface or surfaces of the electronic device.

As shown in FIGS. 2A-2B, the electronic device 200 is implemented as a smart telephone. Other embodiments, however, are not limited to this type of electronic device. Other types of computing or electronic devices can include one or more cameras, examples of which include a netbook or laptop computer, a tablet computing device, a wearable computing or display device such as a watch or glasses, a digital camera, a printer, a scanner, a video recorder, and a copier.

The enclosure 206 can form an outer surface or partial outer surface and protective case for the internal components of the electronic device 200, and may at least partially surround the display 210. The enclosure 206 can be formed of one or more components operably connected together, such as a front piece and a back piece. Alternatively, the enclosure 206 can be formed of a single piece operably connected to the display 210.

The I/O member 208 can be implemented with any type of input or output member. By way of example only, the I/O member 208 can be a switch, a button, a capacitive sensor, or other input mechanism. The I/O member 208 allows a user to interact with the electronic device 200. For example, the I/O member 208 may be a button or switch to alter the volume, return to a home screen, and the like. The electronic device can include one or more input members or output members, and each member can have a single I/O function or multiple I/O functions.

The display 210 can be operably or communicatively connected to the electronic device 200. The display 210 can be implemented with any type of suitable display, such as a retina display or an active matrix color liquid crystal display. The display 210 can provide a visual output for the electronic device 200 or function to receive user inputs to the electronic device. For example, the display 210 can be a multi-touch capacitive sensing touchscreen that can detect one or more user touch and/or force inputs.

Figure 3:
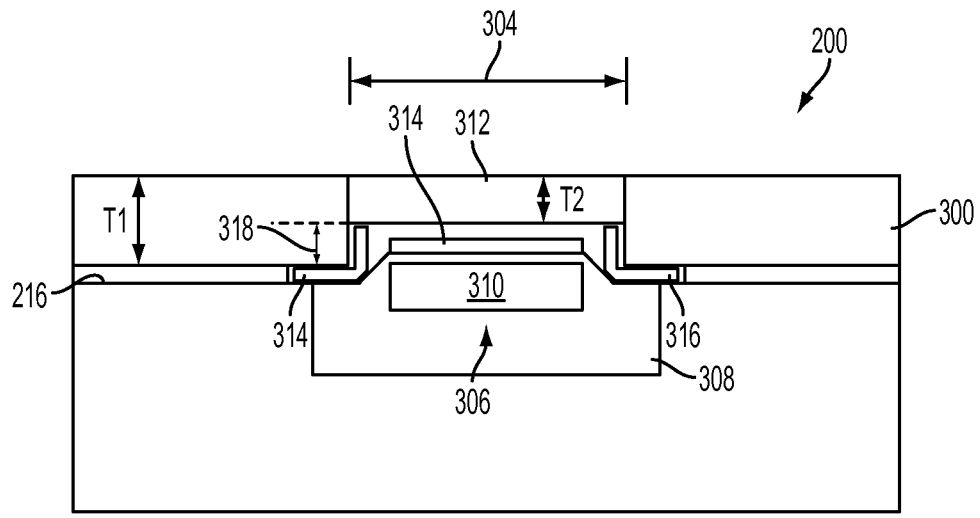
FIGS. 3-5 are simplified cross-section views of examples of the electronic device 200 taken along line A-A in FIG. 2A.
Figure 4:
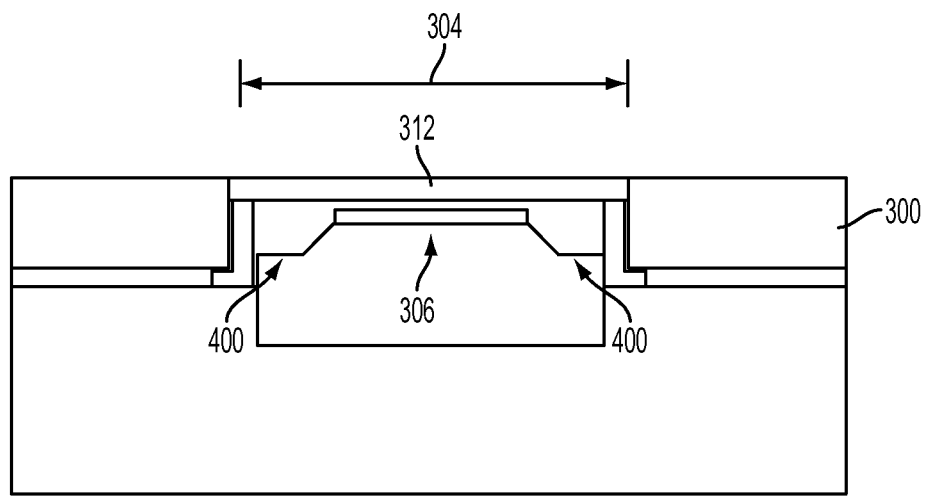
Figure 5:
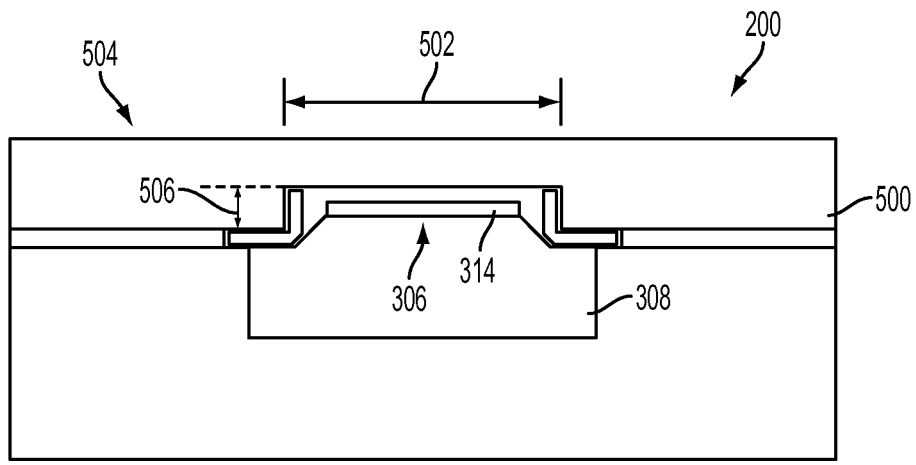

FIGS. 3-5 are simplified cross-sectional views of examples of the electronic device 200 taken along line A-A in FIG. 2A. As shown in FIG. 3, a first cover glass 300 is disposed over the surface 216 of the electronic device 200. The first cover glass 300 has a thickness T1. An opening 304 can be formed through the first cover glass 300 around the light-receiving region 306 of a camera 308. In some embodiments, the light-receiving region of the camera is associated with one or more image sensors 310 included in the camera.

A second cover glass 312 can be disposed in the opening 304. The second cover glass 312 has a thickness T2, and T2 is less than T1. The thinner second cover glass 312 can be made of any suitable material, including, but not limited to, sapphire, glass, acrylic, plastic, and various combination thereof. In some embodiments, the second cover glass 312 is a first lens in optical communication with the camera 308. Additionally or alternatively, a second lens 314 can be positioned between the second cover glass 312 and the camera 308. The second lens 314 can be formed with one or more lenses that each have any given shape and dimensions. Example shapes include, but are not limited to, circular, lozenge, or triangular.

The second cover glass 312 can attach to one or more brackets 316. The bracket or brackets 316 can have any given configuration and size, and can be positioned at any location. Additionally or alternatively, the second cover glass 312 can be attached to a frame (not shown) that attaches to the first cover glass 300. Any suitable attachment mechanism can be used to attach the second cover glass 312 to the bracket(s) 316 and/or to the frame. By way of example only, an adhesive material and/or a fastener can be used to attach the second cover glass 312 to the bracket(s) 316 and/or to the frame.

The opening 304 and the thinner second cover glass 312 provides additional space 318 for the camera 308 and/or the optional second lens 314. In some embodiments, a higher quality camera can be included in the electronic device 200 when the additional space 318 is present. For example, a higher quality camera can include a larger sensor, higher quality lenses, an autofocus feature, and/or a flash module. In some embodiments, a front-facing camera (e.g., camera 202) can be of equal or near-equal quality as a rear-facing camera (e.g., camera 204).

The embodiment shown in FIG. 4 is similar to the embodiment shown in FIG. 3 except that the opening 304 in the first cover glass 300 is larger. The second cover glass 312 is disposed over the light-receiving region 306 and at least part of one or more non-light receiving regions 400 of the camera.

The cross-sectional view in FIG. 5 includes a monolithic cover glass 500. The cover glass 500 has a region 502 that is thinner than other areas 504 of the cover glass 500. Region 502 can have any given shape and dimensions. The thinner region 502 can be disposed over the light-receiving region 306 of the camera 308. Additionally, the thinner region 502 can have a size and/or shape that positions the thinner region over some or all of the non-light receiving regions of the camera 308. Like the first and second cover glasses 300 and 312, the cover glass 500 can be make of any suitable material such as sapphire, glass, plastic, and various combinations of materials.

In some embodiments, the thinner region 502 can be shaped such that the thinner region acts as a lens. The lens can be in optical communication with the light-receiving region 306 of the camera 308. Additionally or alternatively, the second lens 314 can be positioned between the cover glass 500 and the camera 308. The thinner region 502 provides additional space 506 for the camera 308 and/or the optional second lens 314.

Figure 6:
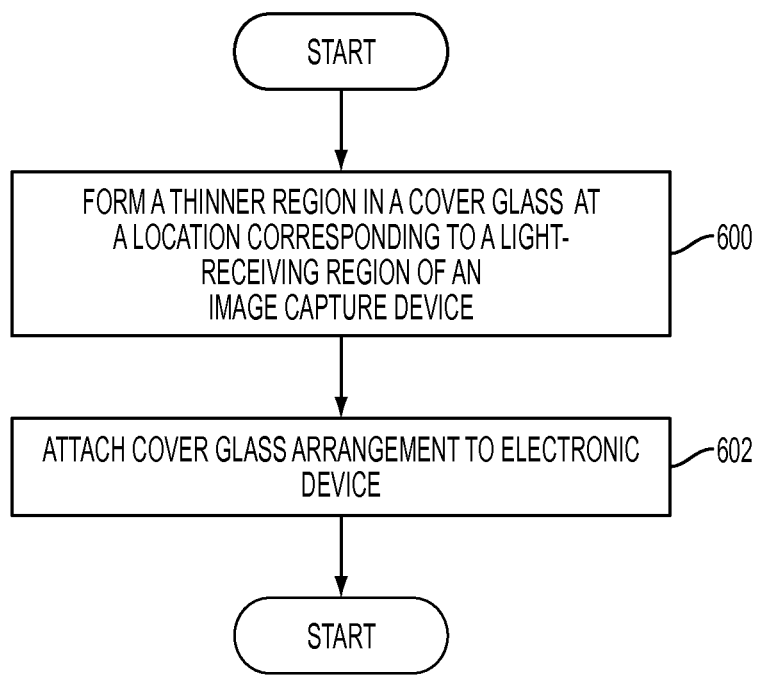
FIG. 6 is a flowchart of a method for producing the cover glass arrangement shown in FIG. 5.

FIG. 6 is a flowchart of a method for producing the cover glass arrangement shown in FIG. 5. Initially, a thinner region can be formed in a monolithic cover glass, as shown in block 600. The thinner region can be formed with any known cutting, shaping, or trimming process. The location of the thinner region can correspond to a light-receiving region of a camera, or to the light-receiving region and at least a part of one or more non-light receiving regions of the camera.

Next, as shown in block 602, the cover glass arrangement can be attached to the electronic device. As described earlier, any suitable attachment mechanism can be used to connect the cover glass arrangement to the electronic device. For example, an adhesive material and/or a fastener can attach the cover glass arrangement to the electronic device.

Figure 7:
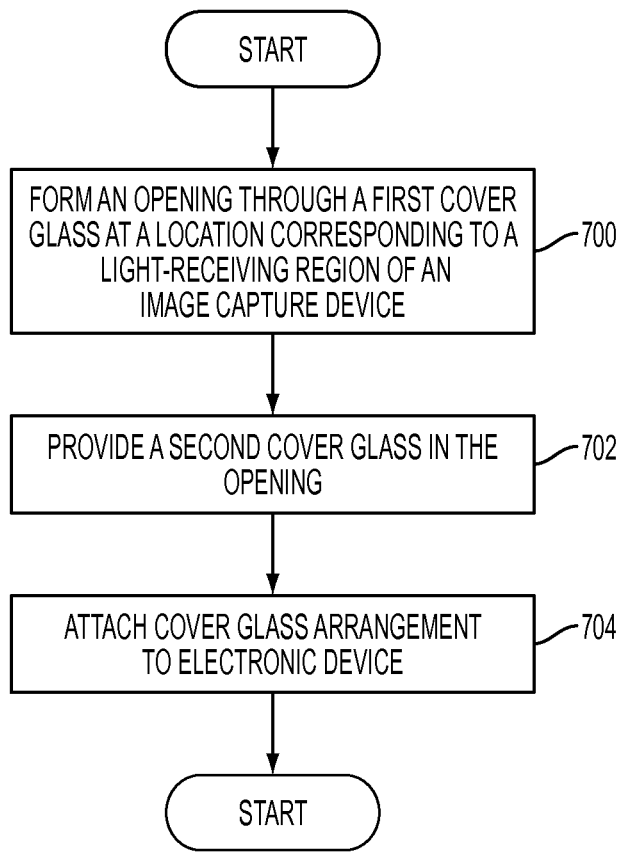
FIG. 7 is a flowchart of a method for producing the cover glass arrangement shown in FIGS. 3-4.

FIG. 7 is a flowchart of a method for producing the cover glass arrangement shown in FIGS. 3-4. Initially, an opening can be formed through a first cover glass (block 700). The opening can be formed using any suitable process. For example, the opening can be formed through the first cover glass by etching or grinding the first cover glass. The location of the opening can correspond to the light-receiving region of a camera, or to the light-receiving region and at least a part of one or more non-light receiving regions of the camera.

A second cover glass can then be positioned in the opening, as shown in block 702. The thickness of the second cover glass is less than the thickness of the first cover glass. The cover glass arrangement can then be attached to the electronic device. In one embodiment, the first cover glass is affixed to a frame in the electronic device. The second cover glass can be attached to the first cover glass, to one or more brackets, and/or to the frame attached to the first cover glass.

Various embodiments have been described in detail with particular reference to certain features thereof, but it will be understood that variations and modifications can be effected within the spirit and scope of the disclosure. And even though specific embodiments have been described herein, it should be noted that the application is not limited to these embodiments. In particular, any features described with respect to one embodiment may also be used in other embodiments, where compatible. Likewise, the features of the different embodiments may be exchanged, where compatible. For example, although the embodiments shown in FIGS. 3-5 depict the front-facing first camera 202 (FIG. 2), those skilled in the art will recognize that the invention can be used with the rear-facing second camera 404. Additionally, a cover glass arrangement can include multiple openings with a second cover glass positioned in each opening, or multiple thinner regions formed in a cover glass. Additionally or alternatively, a cover glass arrangement can include both one or more openings with a second cover glass positioned in each opening and one or more thinner regions.

What is claimed is:

1. An electronic device, comprising:
   an enclosure;
   a camera positioned within the enclosure;
   a cover attached to the enclosure and defining:
      an exterior surface of the electronic device; and
      an opening aligned with a light-receiving region of the camera; and
   a camera cover in the opening and having a thickness different than a thickness of the cover.

2. The electronic device of claim 1, wherein the camera cover is thinner than the cover.

3. The electronic device of claim 1, wherein the camera cover comprises a lens in optical communication with the light-receiving region of the camera.

4. The electronic device of claim 1, wherein:
   the cover is formed from glass; and
   the camera cover is formed from sapphire.

5. The electronic device of claim 1, wherein the opening extends through a complete thickness of the cover.

6. The electronic device of claim 1, wherein the exterior surface of the electronic device is a rear surface of the electronic device that is opposite a display surface of the electronic device.

7. An electronic device, comprising:
   a camera;
   a cover layer defining a portion of an external surface of the electronic device and having an opening therethrough, the cover layer comprising a first transparent material;
   a camera cover disposed in the opening and comprising a second transparent material different than the first transparent material; and
   a display device covered by at least a portion of the cover layer.

8. The electronic device of claim 7, wherein:
   the portion of the external surface is a first portion of the external surface; and
   the camera cover defines a second portion of the external surface that is substantially flush with the first portion of the external surface.

9. The electronic device of claim 8, wherein:
   the camera cover is thinner than the transparent cover layer; and
   at least a portion of the camera extends at least partially into the opening.

10. The electronic device of claim 7, wherein the camera cover is formed from sapphire.

11. The electronic device of claim 7, wherein at least part of the camera extends into the opening.

12. A cover assembly for an electronic device, comprising:
   a cover having a first thickness, configured to form an exterior surface of the electronic device, and defining an opening in a location corresponding to a lens of a camera in the electronic device; and
   a lens cover configured to be positioned within the opening and having a second thickness different than the first thickness.

13. The cover assembly of claim 12, wherein:
   the second thickness is smaller than the first thickness;
   an exterior surface of the lens cover is substantially flush with an exterior surface of the cover when installed on the electronic device; and
   an interior surface of the lens cover is recessed relative to an interior surface of the cover glass when installed on the electronic device.

14. The cover assembly of claim 12, further comprising a bracket coupling the lens cover to the cover.

15. The cover assembly of claim 12, wherein:
   the cover is formed from a first transparent material; and
   the lens cover is formed from a second transparent material different than the first transparent material.

16. The cover assembly of claim 15, wherein the second transparent material is sapphire.

17. A method for producing an electronic device, comprising:
   positioning a cover layer having a first thickness on an enclosure such that an opening through the cover layer is aligned with a light-receiving region of a camera in the electronic device and at least a portion of the camera is at least partially in the opening; and
   disposing a lens cover having a second thickness different than the first thickness in the opening.

18. The method of claim 17, further comprising providing the camera in the enclosure.

19. The method of claim 17, wherein the operation of positioning the cover layer on the enclosure is performed after the operation of disposing the lens cover in the opening.

20. The method of claim 17, further comprising forming the opening through the cover layer.

\* \* \* \* \*